US012530648B1

(12) United States Patent
Querze, III et al.

(10) Patent No.: US 12,530,648 B1
(45) Date of Patent: Jan. 20, 2026

(54) SYSTEMS AND METHODS FOR EVALUATING PERFORMANCE OF CUSTOMER SERVICE AGENT BOTS

(71) Applicant: FMR LLC, Boston, MA (US)

(72) Inventors: Elio Dante Querze, III, Arlington, MA (US); Robert Steven Van Dine, Watertown, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/966,759

(22) Filed: Dec. 3, 2024

(51) Int. Cl.
 G06Q 10/06 (2023.01)
 G06Q 10/0639 (2023.01)

(52) U.S. Cl.
 CPC ................................. *G06Q 10/0639* (2013.01)

(58) Field of Classification Search
 CPC ...................................................... G06Q 10/06
 See application file for complete search history.

(56) References Cited

U.S. PATENT DOCUMENTS

| | | | |
|---|---|---|---|
| 10,873,546 B2 | 12/2020 | Willshire | |
| 10,877,876 B2 | 12/2020 | Kulkarni et al. | |
| 10,977,662 B2 | 4/2021 | Shaw | |
| 2020/0111377 A1* | 4/2020 | Truong | G10L 15/26 |
| 2020/0389419 A1 | 12/2020 | Kulkarni et al. | |
| 2021/0150411 A1* | 5/2021 | Coenders | G06F 21/53 |
| 2021/0201144 A1* | 7/2021 | Jonnalagadda | G06N 3/08 |
| 2022/0036277 A1* | 2/2022 | Ranganathan | H04M 3/51 |
| 2024/0037334 A1* | 2/2024 | Beaver | G06F 40/284 |
| 2024/0177171 A1* | 5/2024 | Thangappa | G06Q 30/016 |
| 2024/0386214 A1* | 11/2024 | Ghoche | G06F 40/35 |
| 2025/0022023 A1* | 1/2025 | Herken | H04L 63/0428 |

FOREIGN PATENT DOCUMENTS

WO WO-2024199689 A1 * 10/2024 ............. G06F 40/35

OTHER PUBLICATIONS

Junfeng Liu, Christopher Symons, and Ranga Raju Vatsavai, Persona-Based Conversational AI: State of the Art and Challenges, Lirio AI Research, Lirio LLC, Behavior Reinforcement Learning Lab, Lirio LLC, Dept. of Computer Science, North Carolina State University, Dec. 4, 2022. (Year: 2022).*

(Continued)

*Primary Examiner* — Kurtis Gills (74) *Attorney, Agent, or Firm* — Cesari and McKenna, LLP (57) ABSTRACT

A computerized method is provided for evaluating performance of a virtual service agent. The method includes automatically generating at least one persona for impersonating a virtual customer by inputting a select demographic profile into a trained large language model (LLM). The method also includes generating (i) a list of questions for the virtual service agent for completing at least one task and (ii) a simulated context comprising at least one of mood or attitude of the virtual customer at beginning of the interaction. The method further includes enabling the virtual customer to interact with the virtual service agent to complete the task via multiple simulated dialogue turns involving the list of questions and the simulated context and evaluating the performance of the virtual service agent based on the dialogue turns.

19 Claims, 4 Drawing Sheets

(56) References Cited

OTHER PUBLICATIONS

Chi, Ryan A., et al., "Dialogue Distillery: Crafting Interpolable, Interpretable, and Introspectable Dialogue from LLMs," Stanford University, Stanford NPL, Chirpy Cardinal, Conference on Alexa Prize SocialBot Grand Challenge 5 Proceedings, Amazon Science, Amazon.com, Inc., retrieved from the Internet <https://stanfordnlp.github.io/chirpycardinal/>, Sep. 2023, pp. 1-31.

Park, Joon Sung, et al, "Generative Agents: Interactive Simulacra of Human Behavior," ACM, UIST'23 Oct. 29-Nov. 1, 2023, San Francisco, CA, USA, arXiv, arXiv:202304.03442v2 [cs.HC], Aug. 6, 2023, pp. 1-22.

* cited by examiner

SYSTEMS AND METHODS FOR EVALUATING PERFORMANCE OF CUSTOMER SERVICE AGENT BOTS

BACKGROUND

Technical Field

This application generally relates to systems, methods and apparatuses, including computer program products, for evaluating the performance of a customer service agent bot by impersonating customers in conversation simulation with persona-driven generative agents.

Background

When testing the performance of a virtual customer service agent, such as a customer service bot built on artificial intelligence (AI) technology, using humans to test each iteration of the customer service bot is inefficient and not feasible in most situations due to, for example, limited resources in terms of acquiring human testers. Therefore, there is a need to automatically test and evaluate the performance of virtual customer service agents at scale with efficiency and accuracy.

SUMMARY

The present invention features systems and methods for using generative AI to simulate virtual customers with different personas for evaluating the performance of a customer service agent bot. The virtual customers are generated to be reasonable and believable. More specifically, by using various personas, various contexts, and LLM settings to simulate the virtual customers, the evaluation system of the present invention can generate a varied and diverse set of conversational data that is believable. In some embodiments, the conversation data is used to evaluate the performance of the agent bot. In some embodiments, the conversational data is used to automatically train the agent bot by identifying and extracting patterns in the conversations and simulating a dialogue flow for the agent bot to follow during interactions with actual customers.

In one aspect, the present invention features a computerized method for evaluating performance of a virtual service agent. The method comprises automatically generating, using a computing device, at least one persona for impersonating a virtual customer by inputting a select demographic profile into a trained large language model (LLM). The method also includes generating, by the computing device, (i) a list of questions for the virtual service agent for completing at least one task that defines a goal to be achieved through interaction with the virtual service agent and (ii) a simulated context comprising at least one of mood or attitude of the virtual customer at beginning of the interaction. The list of questions and the simulated context are customized to the at least one persona of the virtual customer. The method further includes enabling, by the computing device, the virtual customer to interact with the virtual service agent to complete the at least one task. The interaction generates a plurality of dialogue turns between the virtual customer and the virtual service agent. Each dialogue turn of the virtual customer is generated by inputting at least one of the persona, the list of questions and the simulated context into the LLM. The method also includes evaluating, by the computing device, the performance of the virtual service agent based on the plurality of dialogue turns.

In another aspect, a computer-implemented system is provided for evaluating performance of a virtual service agent. The computer-implemented system comprises a computing device having a memory for storing instructions. The instructions, when executed, are configure the computer-implemented system to provide a persona generator, a task generator, a context generator, a dialogue facilitation module and an evaluation module. The persona generator is configured to automatically generate, using a trained large language model (LLM), at least one persona for impersonating a virtual customer by inputting a select demographic profile into the LLM. The task generator is configured to generate a list of questions for the virtual service agent for completing at least one task defining a goal to be achieved through interaction with the virtual service agent. The list of questions is customized to the at least one persona of the virtual customer. The context generator is configured to generate a simulated context comprising at least one of mood or attitude of the virtual customer at beginning of the interaction. The simulated context is customized to the at least one persona of the virtual customer. The dialogue facilitation module is configured to enable the virtual customer to interact with the virtual service agent to complete the at least one task. The interaction generates a plurality of dialogue turns between the virtual customer and the virtual service agent. Each dialogue turn of the virtual customer is generated by inputting at least one of the persona, the list of questions, and the simulated context into the LLM. The evaluation module is configured to evaluate the performance of the virtual service agent based on the plurality of dialogue turns.

Any of the above aspects can include one or more of the following features. In some embodiments, the select demographic profile for generating a persona comprises at least one of a desired age, gender, ethnicity, or wealth threshold characterizing the at least one virtual customer. In some embodiments, each persona is assigned one of more of name, age, occupation, income, gender, ethnicity, and marital status.

In some embodiments, the LLM generates, based on the persona of the virtual customer, a customer segment for characterizing a purchase style of the virtual customer during the interaction with the virtual service agent. In some embodiments, the LLM generates, based on the persona of the virtual customer, a linguistic style for utterance by the virtual customer during the interaction with the virtual service agent.

In some embodiments, evaluating the performance of the virtual service agent comprises generating, by the LLM, a turn-by-turn reflection after each question is asked by the virtual customer to the virtual service agent. The turn-by-turn reflection comprises a self-assessment by the virtual customer using the LLM regarding how the interaction is progressing. In some embodiments, a status of the task after each turn-by-turn reflection is updated and at least one of the list of questions or the context for remainder of the interaction with the virtual service agent is adjusted based on the status update.

In some embodiments, evaluating the performance of the virtual service agent comprises quantifying performance quality of the virtual service agent based on a plurality of metrics including one or more of a duration to complete the a least one task, a rate for task completion, a containment rate without manager escalation, questions least likely to be answered satisfactorily, a number of the dialogue turn for each task, a number of words per dialogue turn and per task, and usage of words, sentences, or dialogue strategies that have higher success rates. In some embodiments, a survey is generated from a perspective of the virtual customer at completion of the at least one task to rate experience with the virtual service agent.

In some embodiments, synthetic conversation data is generated for the virtual service agent based on interactions between the virtual service agent and a plurality of virtual customers impersonating a plurality of different personas generated from a plurality of different demographic profiles that represent a demographically diverse customer base. In some embodiments, a dialogue flow tree is distilled from the interactions between the virtual service agent and the plurality of virtual customers. The dialogue flow tree represents a tree predicting a plurality of ways a conversation can branch when interacting with the virtual service agent. The dialogue flow tree can be a directed cyclic graph.

In some embodiments, distilling a dialogue flow tree from the interactions comprises clustering responses from the virtual service agent from the interactions into a plurality of super nodes based on at least one of similarities to a plurality of topics or similarities among the responses. Distilling the dialogue flow also includes applying semantic clustering within each cluster to generate one or more sub-nodes if an utterance count within the cluster is greater than a threshold. Distilling the dialogue flow further includes determining an utterance text to represent each cluster. The utterance text can be selected from a center of the cluster or generated using the LLM as an ideal response based on the responses in the cluster. In some embodiments, an entry condition is generated for each sub-node to enable correct node activation and response selection during a conversation with the virtual service agent.

In some embodiments, each super node of the dialogue flow tree is expanded by creating one or more new sub-nodes representative of new response options, thereby adding flexibility to conversations with the virtual service agent. In some embodiments, the dialogue flow tree is deepened by creating one or more new super nodes for at least one sub-node to prolong a conversation with the virtual service agent by generating more follow-up responses. In some embodiments, real-user data and analytics are used to refine the plurality of clusters and prioritize the super-nodes based on real-life popularity of respective ones of the plurality of topics.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
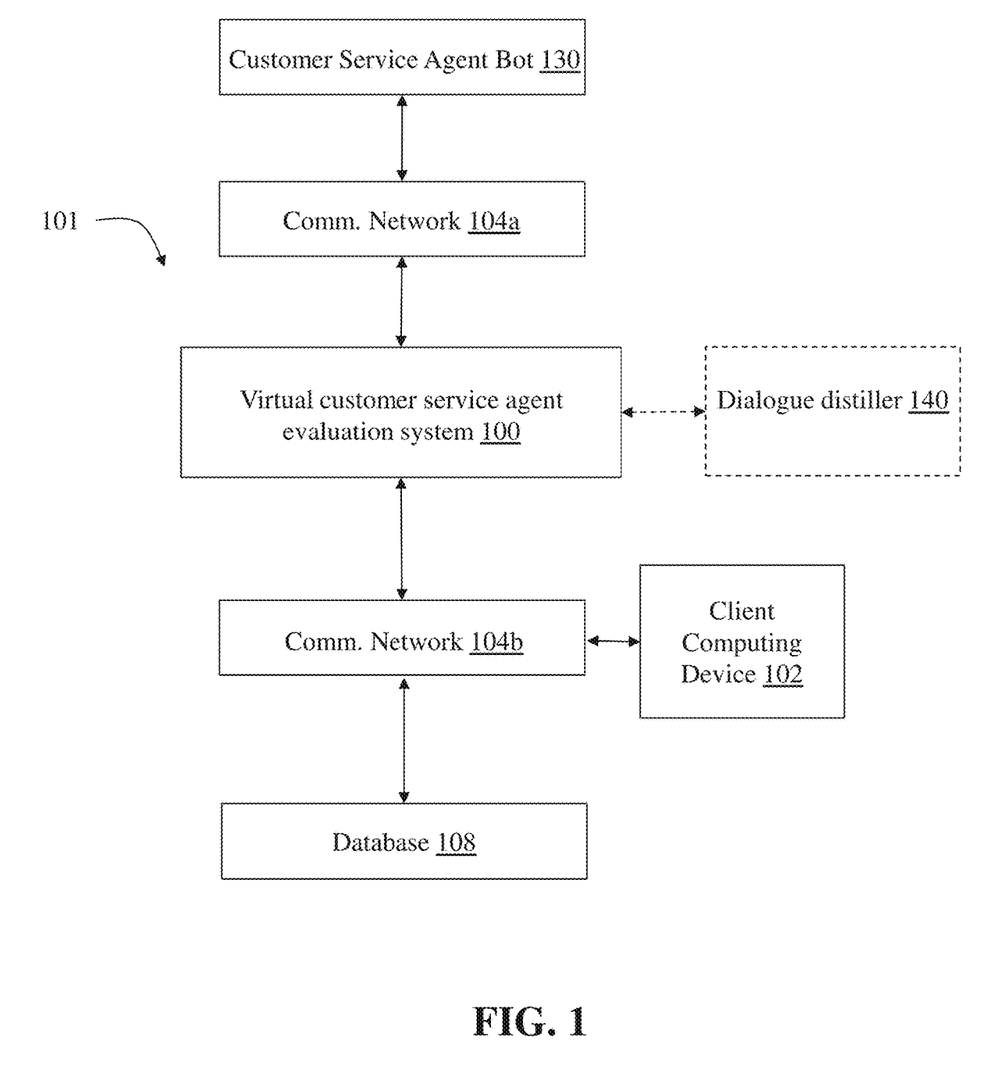
FIG. 1 shows an exemplary diagram of an automated virtual customer service agent evaluation system, according to some embodiments of the present invention.

FIG. 1 shows an exemplary diagram of an automated virtual customer service agent evaluation system 100 used in a computing environment 101 for automatically evaluating the performance of a customer service agent bot, according to some embodiments of the present invention. As shown, the computing environment 101 generally includes at least one client computing device 102, multiple communication networks 104*a*, *b*, a customer service agent bot 130, the virtual customer service agent evaluation system 100, an optional dialogue distiller 140, and at least one database 108.

The customer service agent bot 130 can be an artificial intelligence (AI)-powered software tool that uses natural language processing (NLP) to simulate human conversation and provide customer support. For example, the customer service agent bot 103 can engage customers in conversations to help in a variety of situations including answering questions, resolving issues, directing customers to resources, providing product information, completing transactions, etc. The customer service agent bot 130 can interact with the virtual customer(s) simulated by the evaluation system 100 via the communication network 104*a* for the purpose of agent bot evaluation.

The client computing device 102 can be associated with a user, such as an evaluator, who would like to evaluate the performance of the customer service agent bot 130. The client computing device 102 can connect to the communication network 104*b* to interact with the evaluation system 100, the dialogue distiller 140 and/or the database 108 to provide inputs and receive outputs for display to the user. For example, the computing device 102 can provide one or more detailed graphical user interfaces (GUI) that display evaluation scores and pertinent details for one or more agent bots using the methods and systems described herein. Exemplary computing devices 102 include, but are not limited to, telephones, desktop computers, laptop computers, tablets, mobile devices, smartphones, and internet appliances. It should be appreciated that other types of computing devices that are capable of connecting to the components of the computing environment 101 can be used without departing from the scope of invention. Although FIG. 1 depicts a single computing device 102, it should be appreciated that the computing environment 101 can include any number of client devices for communication by any number of users.

Each of the communication networks 104*a*, *b* enables components of the computing environment 101 to communicate with each other to perform the process of call agent evaluation. Each of the network s104*a*, *b* may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

Each of the evaluation system 100 and the optional dialogue distiller is a combination of hardware, including one or more processors and one or more physical memory modules and specialized software engines that execute on a processor, to receive data from other components of the computing environment 101, transmit data to other components of the computing environment 101, and perform functions as described herein. The specific components and functions of the evaluation system 100 are described below with reference to FIG. 2. The specific components and functions of the dialogue distiller 140 are described below with reference to FIG. 3. In some embodiments, the various components of the evaluation system 100 and/or the dialogue distiller 140 are specialized sets of computer software instructions programmed onto one or more dedicated processors and can include specifically designated memory locations and/or registers for executing the specialized computer software instructions.

The database 108 is a computing device (or in some embodiments, a set of computing devices) that is coupled to and in communication with the evaluation system 100 and/or the dialogue distiller 140 and is configured to provide, receive and store various types of data received and/or created for evaluating the performance of the customer service agent bot 130. In some embodiments, all or a portion of the database 108 is integrated with the evaluation system 100 and/or the dialogue distiller 140 or located on a separate computing device or devices. For example, the database 108 can comprise one or more databases, such as MySQL™ available from Oracle Corp. of Redwood City, California.

Figure 2:
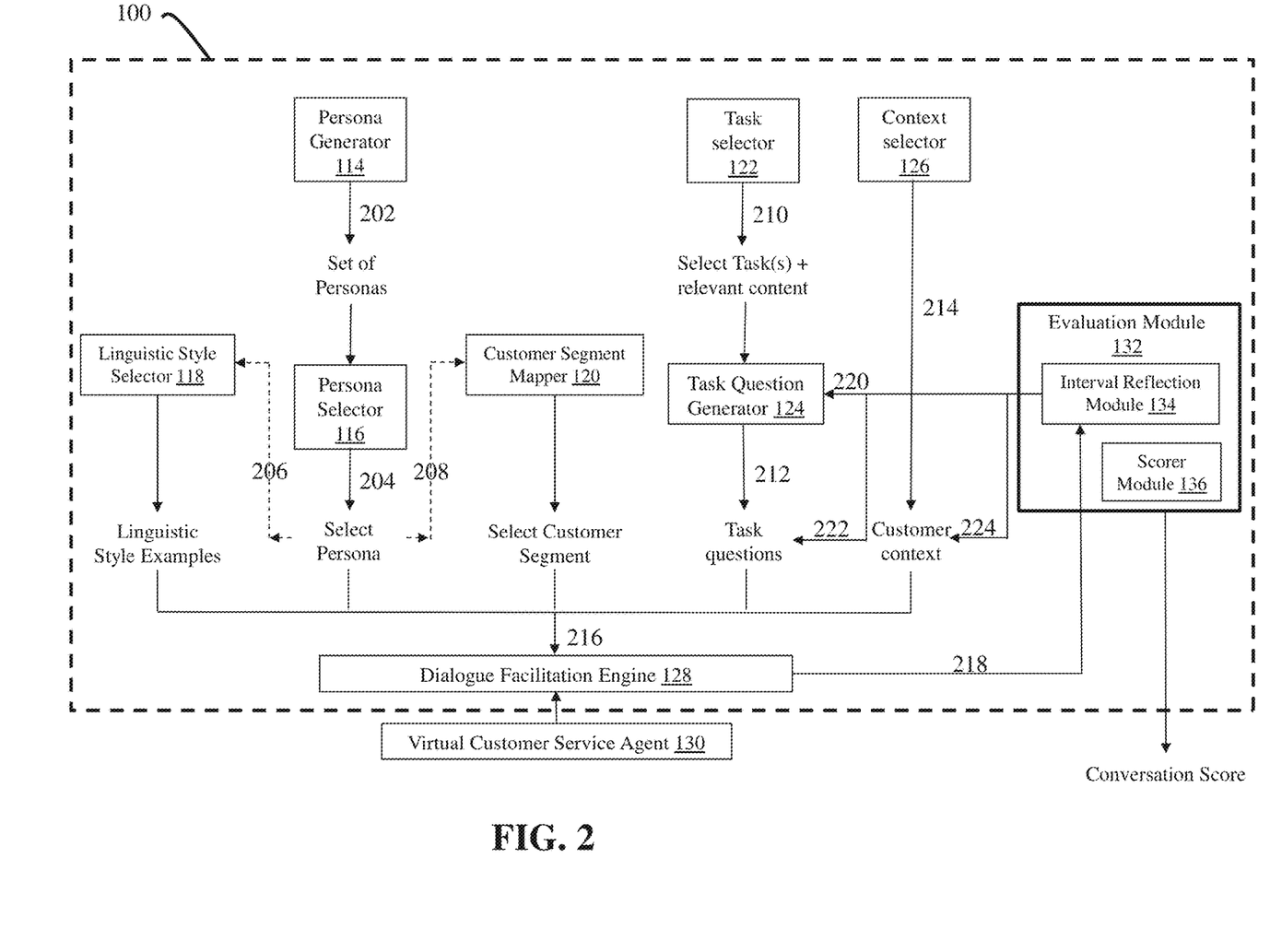
FIG. 2 shows an exemplary process utilized by the evaluation system of FIG. 1 to automatically evaluate the performance of a customer service agent bot, according to some embodiments of the present invention.

FIG. 2 shows an exemplary configuration of the evaluation system 100 of FIG. 1 and an exemplary process utilizing the evaluation system 100 to automatically evaluate the performance of a customer service agent 130, according to some embodiments of the present invention. The process starts at step 202 with a persona generator 114 of the evaluation system 100 automatically generating a set of one or more personas for impersonating one or more virtual customers. In some embodiments, a persona can be generated by the persona generator 114 employing a trained Large Language Model (LLM), such as a Frontier LLM. For example, a persona can be built by inputting a pre-constructed demographic profile into the LLM, where the demographic profile can specify certain personal attributes for characterizing a virtual customer, such as one or more of desired age, name, occupation, gender, ethnicity, marital status, income and wealth, etc. In some embodiments, multiple customer personas are generated by the persona generator 114 to represent demographic diversity in the U.S. census data by inputting, for example, a prompt to the LLM requesting data to be generated to match distributions for adults from the recent U.S. census data. In some embodiments, the set of customer personas can be generated by the persona generator 114 off-line via LLM prompting and saved in the database 108 for later use. In alternative embodiments, the set of customer personas can be partially seeded/derived using non-pii data stored in the database 108, such as customer demographics data and/or questions asked by past customers. At runtime, a specific persona from the set of multiple personas can be selected by a persona selector 116 of the evaluation system 100, either by choice (e.g., based on one or more selection criteria) or at random (step 204). The selected persona can be used to impersonate a virtual customer who will interact with the customer service agent bot 130 later in the process.

As an optional step (step 206), a linguistic style generator 118 of the evaluation system 100 can use a LLM to generate, based on the selected persona (from step 204), an exemplary set of stylistic utterances to simulate the way the virtual customer would interact (e.g., speak) with the virtual customer service agent 130. The resulting sample stylistic utterances can be inserted into the customer prompt at runtime (i.e. during interaction with the service agent) as "few-shot" examples that help the LLM to generate more realistic customer utterances. The stylistic language examples are created by the linguistic style selector 118 to promote diversity in customer linguistic style and communication strategy when later interacting with the customer service agent bot 130.

As another optional step (step 208), a customer segment mapper 120 of the evaluation system 100 can assign/map a particular customer segment to the selected persona (from step 204). The customer segment can be selected from a predefined set of one or more customer segments with varied purchase priorities and styles. For example, if the customer service agent bot 130 is deployed in the financial services industry, the customer segments can define different financial priorities and investment styles, such as the do-it-yourself type, juggling type, aspiring types, collaborator type, safe guarder type, etc., where each customer segment possesses its own characteristics. These segments can further assist the evaluation system 100 later in simulating accurate role-playing between the virtual customer and the customer service agent bot 130. In operation, the customer segment mapper 120 can select the most suitable customer segment from the set of predefined customer segments using either a set of predetermined criteria (if the customer segment mapper 120 is a rule-based engine) or a LLM with customized prompts. For example, the customer segment mapper 120 can generate a customer segment for a select persona by inputting the persona demographic information into an LLM and asking the LLM to automatically select the most appropriate customer segment. Thus, steps 206 and 208 can assign optional linguistic styles and/or optional customer segment to the select persona of a virtual customer to further define interactions between the virtual customer and the agent bot 130.

At step 210, a task selector 122 of the evaluation system 100 can select for the select virtual customer persona (from step 204) one or more tasks defining one or more goals to be realized through interaction with the customer service agent bot 130 (e.g., to deduct money from the customer's 401k account). In general, a task can include a description of what the customer is trying to accomplish and a definition of "success" for accomplishing the task. In some embodiments, the task selector 122 assigns one or more predefined tasks that are appropriate to the select persona based on the select customer segment. For example, the task selector 122 may not assign a young investor persona (in his/her twenties) the task of inquiring about a College Savings Plan. Alternatively, the task selector 122 can (i) navigate relevant online content and automatically generate tasks (in real time or near real time) based on any extracted content that matches the select persona, or (ii) input prompts into an LLM to create a persona-specific task. At step 212, a task question generator 122 of the evaluation system 100 inputs the select task (from step 210) into a LLM as a prompt, along with the select persona of the virtual customer (from step 204), the optional linguistic style examples (from step 206), and/or the optional customer segment (from step 208), to generate a list of questions to ask the virtual agent to complete the select task. Thus, the list of questions constitutes a plan by the persona for interacting with the virtual customer service agent prior to the call. In some embodiments, the list of questions is changeable and can be updated during the interaction (e.g., conversation) between the virtual customer and the agent bot 130, as described below in detail.

At step 214, a customer context selector 126 of the evaluation system 100 is configured to determine a simulated context for the virtual customer that represents at least one of mood or attitude of the virtual customer at the beginning of the interaction, how the customer feels the interaction is going, and/or how much time the customer has to complete the task (e.g., whether the customer is in a rush), which may provide alternative behavior that invokes more variance for dialogue patterns and strategies. The customer context selector 126 can (i) assign a context by selecting (either randomly or based on a criterion) it from a predefined list of contexts or (ii) input prompts into an LLM to create a more intricate persona-specific backstory/context, thereby providing more variation in conversational data. In some embodiments, the context is changeable and can be updated during the interaction (e.g., conversation) between the virtual customer and the agent bot 130, as described below in detail.

At step 216, a dialogue facilitation engine 128 of the evaluation system 100 is configured to enable the virtual customer to interact with the customer service agent bot 130 to complete the select task(s). Such interaction can be defined as a series back-and-forth, turn-by-turn dialogues between the virtual customer and the agent bot 130. For example, one dialogue turn can be defined as one question/response from the virtual customer or the agent bot and a follow-up question/response from the other party. The conversation between the virtual customer and the agent bot can be conducted over a number of communication channels, including telephony, text, computer, etc. For example, web services within a virtual private cloud (VPC) can be used to facilitate conversations between the two virtual parties.

To simulate the virtual customer, the dialogue facilitation engine 128 inputs a variety of customer prompts, including one or more of the select customer persona (from step 204), the select customer segment (from step 208), the list of task questions (from step 212), the customer context (from step 214) and the optional linguistic style examples (from step 206) into a LLM, where these prompts represent characteristics for impersonating the virtual customer. Based on these customer prompts, the LLM is adapted to generate a series of dialogue from the perspective of the virtual customer for engagement with the agent bot 130 to accomplish the select task. In some embodiments, the list of task questions is only one part of the prompts; the LLM ultimately decides how to proceed in the conversation with the virtual agent by considering all the prompts entered, which may or may not involve asking the exact task questions. Each simulated customer dialogue is adapted to generate a response from the agent bot 130, where each simulated customer dialogue is generated by executing the LLM with customized prompts after receiving every response from the agent bot 103, until the desired task is successfully accomplished. Thus, multiple dialogue turns can be generated to ask/answer the list of task questions between the virtual customer and the agent bot 103 to accomplish the select task.

At step 218, an evaluation module 132 of the evaluation system 100 can evaluate the performance of the customer service agent bot 130 based on one or more of the dialogue turns generated during the conversation between the virtual customer and the agent bot 130. In some embodiments, the evaluation module 132 includes a reflection module 134 configured to, after each dialogue turn/exchange between the virtual customer and the agent bot 130, automatically analyze and reflect upon the interactions up to that point of the conversation. More specifically, each turn-by-turn reflection can involve the reflection module 134 asking the virtual customer to self-assess (e.g., after each dialogue turn) how the interaction is going by inputting into a LLM the conversation history up to that point in time. For example, at each turn of the conversation, the reflection module 134 may make a call to an LLM to interpret the conversation history thus far. This may include application of one or more of dialogue act classification, intent classification, topic detection, named entity recognition and/or other relevant extracted features such as N-gram counts and TF-IDF (term frequency Inverse document frequency). In alternative embodiments, instead of the reflection module 134 causing the virtual customer to perform the self-assessment after each turn, the reflection module 134 can specify other intervals for performing the self-assessment, such as at every other turn or at the end of the conversation. In some embodiments, the dialogue history from these turns can be stored in the database 108 for easy access by the evaluation module 132.

Based on the reflections generated by the LLM from the perspective of the virtual customer at regular intervals of the conversation, the reflection module 134 can perform one or more corrective adjustments in the middle of the conversation between the virtual customer and the agent bot 130 to improve the quality of the remainder of the conversation. In a feedback loop, the reflection module 134 can rewrite portions of the prompts (e.g., linguistic style examples, persona, customer segment, task questions, and/or customer context) inputted into the LLM by the dialogue facilitation engine 128 to simulate the next turn of conversation of the virtual customer. For example, one of the adjustments can be the reflection module 134 updating the task status, including the status of any sub-tasks, by interacting with the task question generator 124 (at step 220). Another adjustment can be the reflection module 134 editing the list of task questions, such as automatically adding or removing any question to/from the question list to account for any new or unanswered questions (at step 222). Yet another adjustment can be the reflection module 134 updating the context, including the attitude, of the virtual customer (at step 224). In general, the virtual customer can update the content of the task and the context at each dialogue turn (or at another set interval) during the reflection step. Thus, the reflection from the virtual customer is injected into the prompts to the LLM to create the next dialogue turn for the virtual customer. As illustrated in FIG. 2, the feedback loop can comprise (i) step 218 when the dialogue facilitation engine 128 supplies most current conversation history to the interval reflection module 134, (ii) step 220, 224 or 224 when the interval reflection module 134 interacts with the task question generator 124 to alter the task goal, update the list of task questions and/or update the customer context, respectively, based on analysis of the conversation history, and (iii) step 216 when these altered prompts, along with other prompts are injected into the LLM to create the next dialogue turn for the virtual customer.

In addition to asking the virtual customer to perform self-assessment using a LLM on a turn-by-turn basis as described above, the evaluation module 132 can also quantify the quality of the bot response by scoring the dialogue history with respect to one or more metrics. In some embodiments, such statistics-based scoring can be performed by a scorer module 136 of the evaluation module 132 at the conclusion of the conversation between the virtual customer and the bot 130 or based on multiple conversations conducted between multiple virtual customers and the bot 130. These metrics can include, for example, how much time the bot 130 takes to complete a task, task completion rate, containment rate (manager escalation), questions least likely to be answered satisfactorily, how many turns of dialogue for each task (min, max, avg, median, etc.), how many words per turn, per task, what words, sentences and/or dialogue strategies have higher success rates and vice versa. In some embodiments, the scorer module 136 can compute natural language understanding (NLU) corpus level statistics and visualize how the NLU of the customer service agent bot 130 is inferring at each dialogue turn. The NLU corpus level statistics include, but are not limited to, counts of intents (using intent classification), named entities (using named entity recognition), topics (using topic detection), dialogue acts (using dialogue act classification, and/or other relevant features (using N-gram counts and TF-IDF). In some embodiments, NLU Corpus statistics are evaluated across a set of generated conversation or a significantly-sized subset to analyze counts of each of the above, co-occurrence statistics, and patterns of use across the synthetically generated data set of conversations. These patterns may be, for example, number of turns until the first question, number of times a topic changes, co-occurrences, and count in location of the conversation (e.g., how often at the beginning, middle, end).

In some embodiments, at the conclusion of the interaction between the virtual customer and the customer service agent bot 130, the scorer module 136 can complete a survey from the perspective of the virtual customer and rate the experience of the virtual customer with the agent bot 130. This can be accomplished by inputting the survey and the dialogue history into an LLM, where the dialogue history is used for context on the survey. The results of the survey can be used to identify interactions that were either more likely to be problematic or exemplary. In general, the agent bot evaluation process explained above with respect to FIG. 2 shows that a wide variety of inputs can be taken into consideration when automatically generating the virtual customers for the purpose of testing a virtual customer service agent. This form of automated testing at scale can identify issues and defects quickly and effectively.

In an optional aspect of the present invention, the dialogue distiller 140 can interact with the virtual customer service agent evaluation system 100 to automatically generate a dialogue flow for use by a customer service agent bot. The dialogue flow can be distilled offline from a diverse set of conversations simulated by the evaluation system 100 between the agent bot and multiple virtual customers with diverse personas, all with the common goal of completing a given task. Therefore, the conversational capability of the virtual customer service agent can be distilled into near symbolic conversation rules. The dialogue distiller 140 can produce the dialogue flow by identifying and extracting patterns from these conversations. In some embodiments, the dialogue flow represents a tree that captures all or at least the most common ways the customer service agent bot can branch in terms of responses when conversing with a customer (either real or virtual) to complete a task. In some embodiments, the conversation histories based on which the dialogue flow is generated can be stored in the database 108 for future review and analysis.

As an example, given a task, the dialogue distiller 140 can evoke the evaluation system 100 to simulate multiple conversations with a customer service agent bot to achieve this task, where each conversation is between a different virtual customer (with a different simulated persona) and the same agent bot. Thereafter, the dialogue distiller 140 can input the multiple conversations into an LLM to determine certain rules and patterns, such as the most common follow-up questions that branch out from that initial question. In some embodiments, if an unwanted pattern is created from this process, a human can update/edit the resulting dialogue flow tree. The distilled conversational flow can be a directed cyclic graph representing all or most of the ways/rules a conversation with the virtual customer service agent can branch. This process of synthetic conversation data generation eliminates the heavy cost, long latency, and hallucination issues in conventional customer-facing run-time Generative AI applications. It also eliminates the need to perform manual conversational data collection and annotation. Finally, it significantly reduces human involvement because instead of humans hand crafting each rule, they only need to review and edit the rules/patterns automatically generated.

Figure 3:
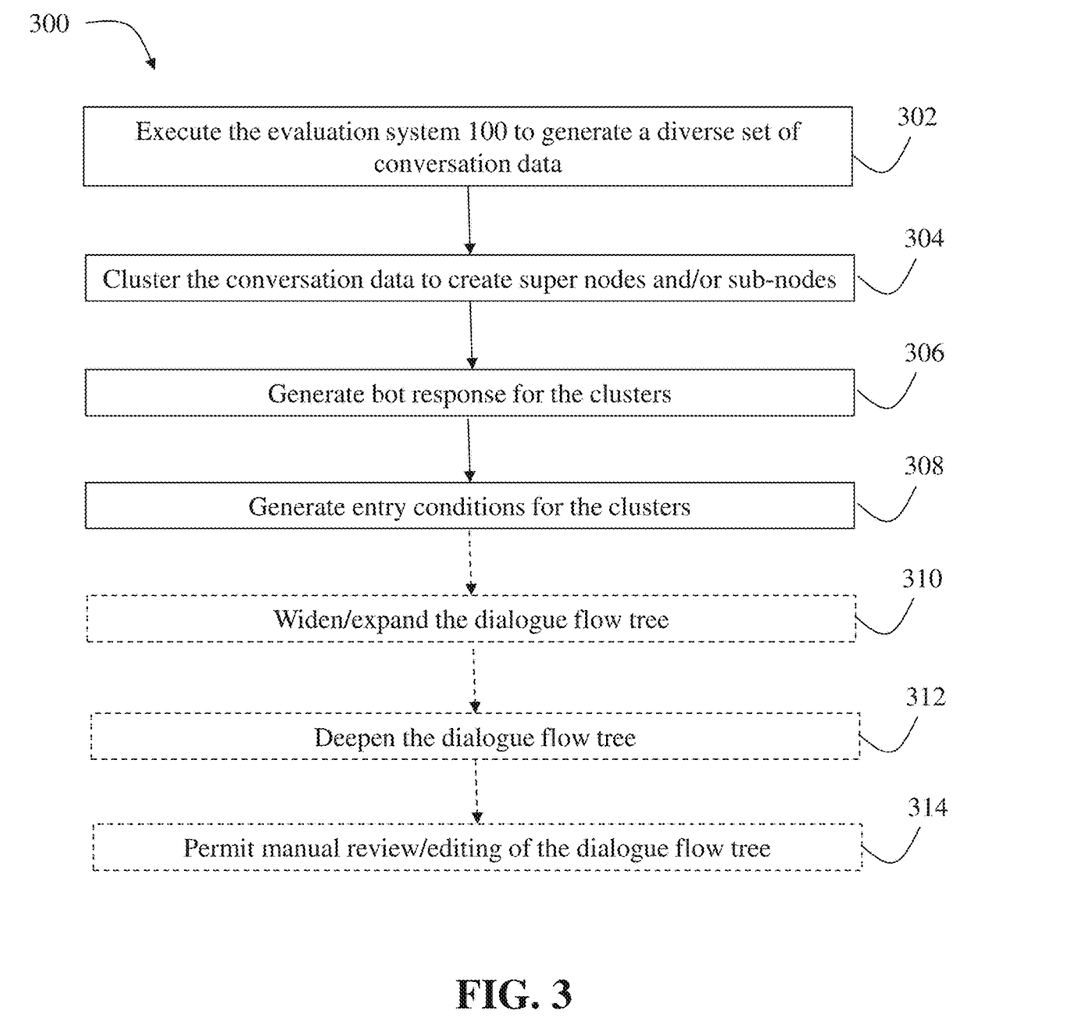
FIG. 3 shows an exemplary process implemented by the dialogue distiller of FIG. 1 for automatically generating a dialogue flow for a customer service agent bot by interacting with the evaluation system of FIG. 1, according to some embodiments of the present invention.

FIG. 3 shows an exemplary process 300 implemented by the dialogue distiller 140 of FIG. 1 for automatically generating a dialogue flow for a customer service agent bot by interacting with the evaluation system 100 of FIG. 1, according to some embodiments of the present invention. In general, the dialogue distiller 140 generates the dialogue flow by leveraging the persona-driven agent architecture of the evaluation system 100 with contextual prompting cues and self-reflection capability. Additionally, the dialogue distiller 140 uses natural language understanding (NLU) techniques, such as dialogue act classification and supervised topic detection, to automatically derive a graph structure with rules that represent a flow of responses the agent bot can follow during a conversation with a customer, either real or virtual.

The process 300 starts at step 302 with the dialogue distiller 140 interacting with the evaluation system 100 to generate a diverse set of synthetic conversation data based on interactions between the customer service agent bot and multiple virtual customers impersonating multiple different personas. These personas can be generated by the personal generator 114 and selector 116 of the evaluation system 100 from different demographic profiles that represent a demographically diverse customer base. In addition to the varied personas, the evaluation system 100 can use LLMs to simulate varied virtual customer utterances (e.g., using the linguistic style selector 118), customer segments/contexts (using the customer segment mapper 120) and/or task contexts (using the context selector 126) to create an even more diverse range of conversation data. In some embodiments, during conversation simulation by the dialogue facilitation engine 128 of the evaluation system 100 between the agent bot and each virtual customer, the dialogue facilitation engine 128 can use an additional LLM call per dialogue turn for self-reflection by the virtual customer on how the conversation is progressing and adapt virtual customer behavior accordingly (using the interval evaluation module 134).

At step 304, after the conversation data is generated, which can be stored in database 108, the dialogue distiller 140 creates clusters based on the collected conversation data. In some embodiments, clusters in the form of super nodes are created using Supervised Topic Classification and Dialogue Act Classifier. Each super node models a node in a conversation graph that represents a dialogue turn from the virtual customer and a follow-up from the virtual service agent or vice versa. Each super node comprises a pair of dialogue act and at least one relevant topic that functions as an entry condition. The dialogue act of each super node is an atomic unit of conversation characterized by a specific communicative function, such as a question, statement, opinion, greeting, or command/instruction. The topic of each super node specifies a topic under which one or more response possibilities related to the topic are provided. Inside of each super node are variations in utterances that are semantically similar enough to be clustered into this node. In addition, a representative input/output pair are selected for this cluster. In some embodiments, the remaining conversation data is clustered using a semantic affinity propagation clustering technique, such as a SentenceBERT embeddings and an affinity propagation model to group conversation data by similarity. In some embodiments, when an utterance count within each super node/cluster is above a predefined threshold, semantic clustering can be used within the cluster to generate one or more sub-nodes. Each of these sub-nodes can specify a sub-topic within the topic of the corresponding super-node. As an example, a super node may be a customer asking if they can withdraw from their 401k early, and the customer service agent saying yes, but providing a warning on tax implications and asking if they can proceed with some clarifying questions. The dialogue act for the customer is a question, and the topic is 401k Withdrawal. Questions with this topic that are with close enough semantic similarity will be matched into this cluster.

At step 306, a response/utterance is generated for each cluster of sub-node (or super node if there is no sub-node within the super node). More specifically, for each clustered scenario in the form of either a super node or a sub-node, the dialogue distiller 140 is configured to select an utterance text from the cluster center or use LLMs to generate an ideal utterance based on multiple examples of utterances from the cluster. This utterance text represents a response for the agent bot to use during a conversation with a customer in the event that the corresponding clustered scenario is realized.

At step 308, the dialogue distiller 140 sets one or more entry conditions for each sub-node to enable correct node activation and response selection (generated at step 306) by the customer service agent bot.

At step 310, the dialogue distiller 140 can optionally expand one or more super nodes (representative of dialogue topics) by creating more sub-nodes (representative of response options) from generated virtual customer responses. Such an expansion widens the dialogue flow tree and is adapted to add more flexibility to conversations by providing more response options to the agent bot.

At step 312, the dialogue distiller 140 can optionally deepen the dialogue flow tree comprising the super nodes and sub-nodes. More specifically, the dialogue distiller 140 can create follow-up super nodes for one or more sub-nodes to continue the conversation depth seamlessly. In some embodiments, a follow-up super node is created using conversational history data and prompt LLM to generate specific or generalized follow-up questions based on virtual customer responses. In some embodiments, selective deepening is used by the dialogue distiller 140 to deactivate rarely used super nodes, thereby preventing a combinatorial explosion of nodes.

At step 314, the dialogue distiller 140 optionally permits the resulting dialogue flow tree to be manually reviewed, edited, or otherwise enhanced by humans (e.g., generate additional sub-nodes and responses) to ensure quality and coherence.

In some embodiments, steps 302-314 can be iterated one or more times to improve dialogue flow quality. For example, data and analytics from conversations between a agent bot and real customers can be used by the dialogue distiller 140 to refine the clusters of the dialogue flow tree, such as prioritize popular super nodes. As another example, the dialogue distiller 140 can evaluate and analyze conversation data generated as a result of the agent bot following the dialogue flow tree, such as collect statistical metrics (e.g., the number of dialogue turns and/or words per turn) and agent function call counts (e.g., escalation to supervisor). More specifically, the agent function calls that are tracked can include, for example, thank and end conversation (indication of success), abandon conversation (indication of severe failure ending in frustration), and conversation escalating to live customer service representative or manager (indication of failure). As yet another example, the dialogue distiller 140 can virtually interview the agent bot after a conversation using the dialogue flow tree to assess engagement ratings.

Figure 4:
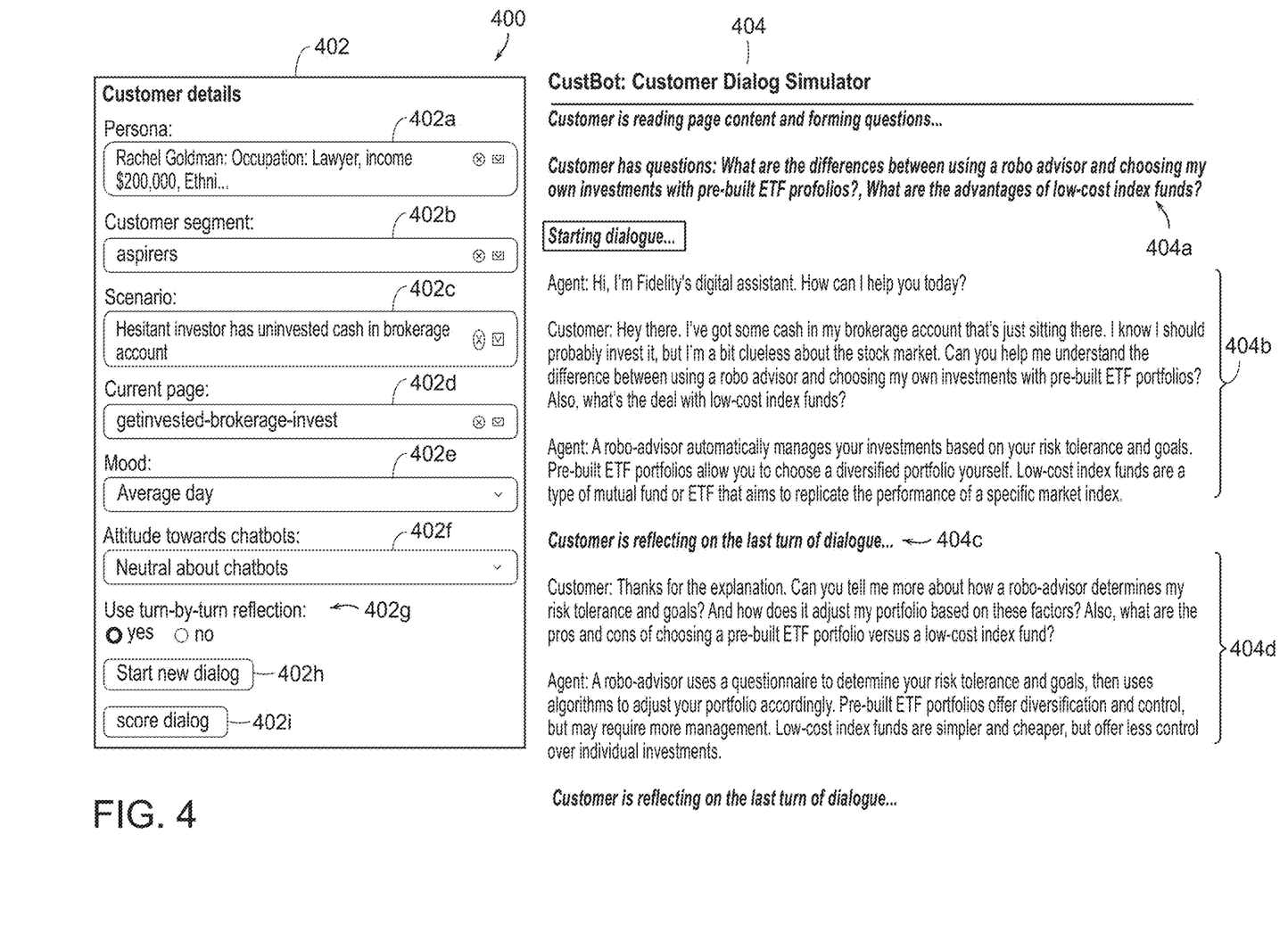
FIG. 4 shows an exemplary graphical user interface (GUI) 400 displayed to a user for evaluating the performance of a customer service agent bot, according to some embodiments of the present invention.

FIG. 4 shows an exemplary graphical user interface (GUI) 400 displayed to a user for evaluating the performance of a customer service agent bot, according to some embodiments of the present invention. As shown, the GUI 400 is generally divided into two regions, with one region 402 showing the characteristics of a simulated virtual customer and the other region 404 displaying a simulated conversion between the virtual customer and the service agent bot.

In the customer details region 402, the user can select from a dropdown menu 402a one of multiple customer personas generated by the persona generator 114. Alternatively, the persona selector 116 can automatically select the persona for the virtual customer, either at random or based on certain predefined criteria. As shown, the personas can comprise one or more of a simulated name, occupation, income level, ethnicity, etc. In addition, the user can select from a dropdown menu 402b a customer segment for the virtual customer, such as one of aspirers, DIYers, jugglers, collaborators, safe guarders, etc. Alternatively, the customer segment mapper 120 can automatically select the customer segment for the virtual customer, either at random or based on certain predefined criteria. Moreover, the user can select from a dropdown menu 402c a task context for a task to be completed through interactions between the virtual customer and the customer service agent bot. Alternatively, the context selector 126 can automatically select the task context using for example, content from a relevant webpage, which may elicit more specific task questions. In some embodiments, the user can choose from a dropdown menu 402e a mood of the virtual customer and/or from a dropdown menu 402f an attitude of the virtual customer toward the agent bot at the beginning of the interaction. Alternative, the customer context selector 126 can automatically determine a simulated mood and/or attitude of the virtual customer. In some embodiments, the user can choose whether turn-by-turn reflection 402g is activated during the conversation, which allows the interval reflection module 134 to analyze each turn of the conversation between the virtual customer and the agent bot as the conversation progresses and update the remainder simulated dialogue of the virtual customer accordingly in a feedback loop to the dialogue facilitation engine 128.

Upon selection of the desired settings, the user can activate the "start new dialogue" button 402h, in which case the dialogue facilitation engine 128 inputs the customer details 402a-f as prompts into an LLM to simulate dialogues from a virtual customer in a conversation with the customer service agent bot. Dialogue region 404 is configured to display the simulated dialogues between the virtual customer and the agent bot as they converse with each other to complete the task/task question described in the top area 404a of the dialogue region 404. More specifically, the dialogue from the virtual customer is generated by the dialogue facilitation engine 128 while the dialogue from the virtual agent is generated by the agent bot. In some embodiments, after each dialogue turn 404b, which consists of at least one substantive dialogue from one of the virtual customer or the agent bot and at least one substantive dialogue from the other party in response, the virtual customer can reflect on the conversation thus far, as indicated by the reflection indicator 404c. This reflection may alter the course of the subsequent dialogue turn 404d between the virtual customer and the agent bot in a manner as described above.

At the conclusion of the conversation between the virtual customer and the agent bot, the user can activate the "score dialogue" button 402i in region 402, in which case the scorer module 136 is activated to score the performance of the agent bot.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for evaluating performance of a virtual service agent, the method comprising:
    generating by a computing device, synthetic conversation data for the virtual service agent based on interactions between the virtual service agent and a plurality of virtual users for a plurality of different personas;
    distilling, by the computing device, a dialogue flow tree from the synthetic conversation data, wherein the dialogue flow tree represents a tree predicting a plurality of ways a conversation can branch when interacting with the virtual service agent;
    automatically generating, by the computing device using a trained first large language model (LLM), a virtual user that impersonates a human user and a persona for the virtual user by inputting a select demographic profile into the first LLM;
    generating, by the computing device, (i) a list of questions associated with at least one task that is specific to the virtual user, in which the list of questions is configured to be asked by the virtual user in an interaction with the virtual service agent to cause the virtual service agent to complete the at least one task for the virtual user and (ii) a simulated context comprising at least one of mood or attitude of the virtual user at a beginning of the interaction, and wherein the list of questions and the simulated context are customized to the persona of the virtual user;
    causing, by the computing device, the virtual user to interact with the virtual service agent to complete the at least one task according to the dialogue flow tree, wherein the interaction generates a plurality of dialogue turns between the virtual user and the virtual service agent, and wherein each of the dialogue turns of the virtual user is generated by inputting at least one of the persona, the list of questions and the simulated context into the first LLM;
    generating, by the computing device using a trained second LLM, after an end of each dialogue turn of the plurality of dialogue, a turn evaluation which indicates a progression of the interaction, wherein the turn evaluation is used by the first LLM to modify a behavior of the virtual user in the interaction with the virtual service agent; and
    evaluating, by the computing device, the performance of the virtual service agent based on the plurality of dialogue turns.

2. The computerized method of claim 1, wherein the select demographic profile comprises at least one of a desired age, gender, ethnicity, or wealth threshold characterizing the at least one virtual user.

3. The computerized method of claim 1, wherein evaluating the performance of the virtual service agent comprises generating, by the first LLM, a turn-by-turn reflection after each question is asked by the virtual user to the virtual service agent.

4. The computerized method of claim 3, further comprising updating a status of the task after each turn evaluation and adjusting at least one of the list of questions or the context for remainder of the interaction with the virtual service agent based on the status update.

5. The computerized method of claim 1, wherein evaluating the performance of the virtual service agent comprises quantifying performance quality of the virtual service agent based on a plurality of metrics including one or more of a duration to complete the a least one task, a rate for task completion, a containment rate without manager escalation, questions least likely to be answered satisfactorily, a number of the dialogue turn for each task, a number of words per dialogue turn and per task, and usage of words, sentences, or dialogue strategies that have higher success rates.

6. The computerized method of claim 1, further comprising generating, based on the persona of the virtual user, a customer segment for characterizing a purchase style of the virtual user during the interaction with the virtual service agent.

7. Method of claim 1, further comprising generating, using the first LLM, a survey from a perspective of the virtual user at completion of the at least one task to rate experience with the virtual service agent.

8. The computerized method of claim 1, wherein the dialogue flow tree is a directed cyclic graph.

9. The computerized method of claim 1, wherein distilling a dialogue flow tree from the interactions comprises:
    clustering responses from the virtual service agent from the interactions into a plurality of super nodes based on at least one of similarities to a plurality of topics or similarities among the responses;
    applying semantic clustering within each cluster to generate one or more sub-nodes if an utterance count within the cluster is greater than a threshold; and
    determining an utterance text to represent each cluster, wherein the utterance text is selected from a center of the cluster or generated using the first LLM as an ideal response based on the responses in the cluster.

10. The computerized method of claim 9, further comprising generating an entry condition for each sub-node to enable correct node activation and response selection during a conversation with the virtual service agent.

11. The computerized method of claim 9, further comprising expanding each super node by creating one or more new sub-nodes representative of new response options, thereby adding flexibility to conversations with the virtual service agent.

12. The computerized method of claim 9, further comprising deepening the dialogue flow tree by creating one or more new super nodes for at least one sub-node to prolong a conversation with the virtual service agent by generating more follow-up responses.

13. The computerized method of claim 9, further comprising using real-user data and analytics to refine the plurality of clusters and prioritize the super-nodes based on real-life popularity of respective ones of the plurality of topics.

14. The computerized method of claim 1, wherein each persona is assigned one of more of name, age, occupation, income, gender, ethnicity, and marital status.

15. The computerized method of claim 1, further comprising generating, by the first LLM, based on the persona of the virtual user, a linguistic style for utterance by the virtual user during the interaction with the virtual service agent.

16. A computer-implemented system for evaluating performance of a virtual service agent, the computer-implemented system comprising a computing device having a memory for storing instructions, wherein the instructions, when executed, configure the computer-implemented system to provide:
- a persona generator configured to automatically generate, using a trained first large language model (LLM), a virtual user that impersonates a human user and a persona for the virtual user by inputting a select demographic profile into the first LLM;
- a task generator configured to generate a list of questions associated with at least one task that is specific to the virtual user, in which the list of questions is configured to be asked by the virtual user in an interaction with the virtual service agent to cause the virtual service agent to complete the at least one task for the virtual user, wherein the list of questions is customized to the at least one persona of the virtual customer;
- a context generator configured to generate a simulated context comprising at least one of mood or attitude of the virtual user at a beginning of the interaction, wherein the simulated context is customized to the persona of the virtual user;
- a dialogue distiller configured to:
    generate synthetic conversation data for the virtual service agent based on interactions between the virtual service agent and a plurality of virtual users for a plurality of different personas; and
    distill a dialogue flow tree from the synthetic conversation data, wherein the dialogue flow tree represents a tree predicting a plurality of ways a conversation can branch when interacting with the virtual service agent;
- a dialogue facilitation module configured to:
    cause the virtual user to interact with the virtual service agent to complete the at least one task according to the dialogue flow tree, wherein the interaction generates a plurality of dialogue turns between the virtual user and the virtual service agent in response to the list of questions, and wherein each of the dialogue turns of the virtual user is generated by inputting at least one of the persona, the list of questions and the simulated context into the first LLM; and
    generate, using a trained second LLM, after an end of each dialogue turn of the plurality of dialogue, a turn evaluation which indicates a progression of the interaction, wherein the turn evaluation is used by the first LLM to modify a behavior of the virtual user in the interaction with the virtual service agent; and
- an evaluation module configured to evaluate the performance of the virtual service agent based on the plurality of dialogue turns.

17. The computer-implemented system of claim 16, further comprising a reflection module in electrical communication with the task generator, the context generator and the dialogue facilitation module, the reflection module configured to generate, using the first LLM, a turn-by-turn reflection after each question is asked by the virtual user.

18. The computer-implemented system of claim 16, wherein the reflection module is further configured to update a status of the task after each turn evaluation and adjust at least one of the list of questions or the context for remainder of the interaction with the virtual service agent based on the status update.

19. The computer-implemented system of claim 16, wherein the evaluation module is configured to quantitatively evaluate the performance of the virtual service agent based on a plurality of metrics including one or more of a duration to complete the a least one task, a rate for task completion, a containment rate without manager escalation, questions least likely to be answered satisfactorily, a number of the dialogue turn for each task, a number of words per dialogue turn and per task, and usage of words, sentences, or dialogue strategies that have higher success rates.

* * * * *